METHOD AND APPARATUS FOR PATTERN DATA PROCESSING

Filed Oct. 18, 1965 11 Sheets-Sheet 1

INVENTOR.
HAROLD W. DOYLE
BY John A. Duffy
ATTORNEY.

METHOD AND APPARATUS FOR PATTERN DATA PROCESSING

Filed Oct. 18, 1965 11 Sheets-Sheet 2

INVENTOR.
HAROLD W. DOYLE
BY John A. Duffy
ATTORNEY.

INVENTOR.
HAROLD W. DOYLE
BY John A. Duffy
ATTORNEY

July 2, 1968 H. W. DOYLE 3,391,392

METHOD AND APPARATUS FOR PATTERN DATA PROCESSING

Filed Oct. 18, 1965 11 Sheets-Sheet 4

INVENTOR
HAROLD W. DOYLE
BY John A. Duffy
ATTORNEY.

POSITION DATA CONVERTER

TYPICAL PATTERN PRODUCED

INVENTOR.
HAROLD W. DOYLE
BY John A. Duffy
ATTORNEY.

METHOD AND APPARATUS FOR PATTERN DATA PROCESSING

Filed Oct. 18, 1965 11 Sheets-Sheet 6

SIGNIFICANT POINT COMPUTER GRAPH

INVENTOR
HAROLD W. DOYLE
BY John A. Duffy
ATTORNEY.

METHOD AND APPARATUS FOR PATTERN DATA PROCESSING

Filed Oct. 18, 1965 11 Sheets-Sheet 7

INVENTOR.
HAROLD W. DOYLE
BY John A. Duffy
ATTORNEY.

METHOD AND APPARATUS FOR PATTERN DATA PROCESSING

Filed Oct. 18, 1965 11 Sheets-Sheet 8

INVENTOR
HAROLD W. DOYLE
BY John A. Duffy
ATTORNEY.

July 2, 1968 H. W. DOYLE 3,391,392

METHOD AND APPARATUS FOR PATTERN DATA PROCESSING

Filed Oct. 18, 1965 11 Sheets-Sheet 9

INVENTOR.
HAROLD W. DOYLE
BY John A. Duffy
ATTORNEY.

BASE LINE TEST $K_d = .05$

INVENTOR.
HAROLD W. DOYLE
BY John A. Duffy
ATTORNEY.

METHOD AND APPARATUS FOR PATTERN DATA PROCESSING

Filed Oct. 18, 1965 11 Sheets-Sheet 11

INVENTOR
HAROLD W. DOYLE
BY John A. Duffy
ATTORNEY.

United States Patent Office 3,391,392

Patented July 2, 1968

3,391,392

METHOD AND APPARATUS FOR PATTERN DATA PROCESSING

Harold W. Doyle, Newport Beach, Calif., assignor to California Computer Products, Inc., Anaheim, Calif., a corporation of California Filed Oct. 18, 1965, Ser. No. 496,955
14 Claims. (Cl. 340—172.5)

ABSTRACT OF THE DISCLOSURE

A reference garment pattern is digitized and with grading control data and digital data processing methods is converted into data indicative of additional size patterns. Digital computer means are provided for selectively changing the boundaries of the reference pattern according to predetermined grade instructions from grading control data to produce positional data indicative of the additional size patterns.

This invention relates to pattern data and more particularly to a method and apparatus for processing and computing data relating to a pattern.

In the art of manufacturing articles such as clothing from fabrics, there is a continuing efforts and search toward the automation of manufacturing processes. For example, in the garment industry, there is a need to provide more efficient and quality production with a special requirement for automatic production methods. One of the more important processes involved in the manufacture of clothing is that of pattern grading. Grading is the method of increasing or decreasing a sample size pattern proportionately from a reference size according to standard body measurements. A typical garment is manufactured in several sizes to meet customer requirements. It is desirable that all sizes of a particular garment be able to preserve the aesthetic and stylistic qualities present in the reference size. Obviously, if some automatic means could be found to produce garments of all sizes from the reference size, the desired qualities could be better achieved.

All present methods of grading a pattern from one size to another involve manual operations. In a typical method, an operator shifts a pattern piece from point to point, tracing each step as he goes along. In the manual process of grading, due to the very rough approximations that must be made by the grader, the design parameters incorporated in the reference pattern are difficult to maintain and there often results a set of garments of different sizes with the reference size being the only size which clearly reflects the original design. For example, in one present method of grading a particular edge of a pattern, the operator starts from the given edge and, with the edge serving as a drawing template, maneuvers it in an approximate manner to the new size grade between two selected points. In effect, the operator is not grading at all, but merely approximating the new size. He is introducing new designs which were not necessarily in the mind of the original designer. Additionally, the tedious manual operation hampers the achievement of accuracy, quality and efficiency in the manufacturing operation. Accordingly, it is an object of this invention to provide a system for automatically grading a pattern.

The method of this invention automatically produces data for patterns of all the desired sizes from a single reference pattern. Pattern outline data representing the reference pattern is combined with control information specifying dimensional distributions in a digital processor to produce a set of pattern parts in the complete range of desired sizes. The complete design qualities present in the reference pattern are retained. Additionally, the automatic data processing method of the invention allows the manufacturer to control the number of sizes for a given pattern and provides an extremely fast and more efficient operation.

Utilizing digital data processing methods throughout the operation, a reference pattern is converted into patterns of the desired sizes with the resulting patterns being an accurate reflection of the reference pattern and grading control information supplied thereto. The tedious manual operations previously required, which often produced patterns with a poor approximation of the reference pattern, are entirely eliminated with the entire grading operation performed automatically. The tremendous advantages of digital data processing such as accuracy, efficiency and speed are completely utilized in the automatic grading method of the invention.

It is therefore another object of this invention to provide an automatic grading system for producing patterns of predetermined sizes from a reference pattern.

It is another object of this invention to provide a method of grading utilizing digital data processing.

It is a further object of this invention to provide a digital data processing system for converting pattern boundary data into digital positional data indicative of the boundary data.

It is a still further object of this invention to provide a digital data processing system for converting the boundaries of a reference pattern into digital data, combining the digital data with grading instructions for additional patterns and producing digital data indicative of the boundaries of the additional patterns.

These and other objects and systems in accordance with the present invention are achieved through the use of an automatic process utilizing high speed incrementally controlled digital process methods to produce additional size patterns from a reference pattern based on the reference pattern and grading control data. Digital computer means are provided for selectively changing the boundaries of the reference pattern proportionately to produce positional data indicative of the additional size patterns according to the predetermined grade instructions from the grading control data.

According to one embodiment of the invention, a method of selectively increasing or decreasing the edges of a reference size pattern proportionately according to grading instructions is accomplished by converting the reference pattern boundary into incremental positional data based on X and Y coordinate axes, converting the incremental positional data into Cartesian point data, and then interpreting the Cartesian point data according to maximum and minimum deviation criteria with respect to the X and Y coordinate axes to provide significant point positional data. The significant points are utilized for computing control points to be used to control the grading computation. Offset control points are computed for the additional sizes according to the computed control points and grading control data, and offset intermediate points are computed for the additional size patterns according to the intermediate points for the reference pattern and the grading control data. The computed offset control points and offset intermediate points for the additional sizes, in addition to the corresponding control or intermediate points for the reference pattern are graphically displayed on a plotter.

A better understanding of the invention may be had by reference to the following description taken in conjunction with the accompanying drawings in which.

Briefly, in accordance with a principal aspect of the invention, a reference pattern boundary indicative of a pattern to be graded is converted into coordinate positional data. Means responsive to the positional data and grading control data compute positional data for the additional size patterns. The positional data for the additional size patterns may then be utilized such as, for example, in a graphical display system to provide a display of additional size patterns.

According to a more specific aspect of the invention, an automatic curve follower is utilized to convert a reference pattern boundary into X and Y coordinate incremental positional data. Data converter means convert the incremental data into Cartesian point data. Computer means responsive to the Cartesian point data compute significant points. Control point computer means responsive to the significant point data and the Cartesian point data compute control points. A grade computer responsive to the control point data, the Cartesian point data, and the grade control data computes offset control point and intermediate point data indicative of the pattern boundaries of the additional size patterns. This data is then graphically displayed to provide a display of all of the additional patterns, in addition to the reference pattern.

Figure 1:
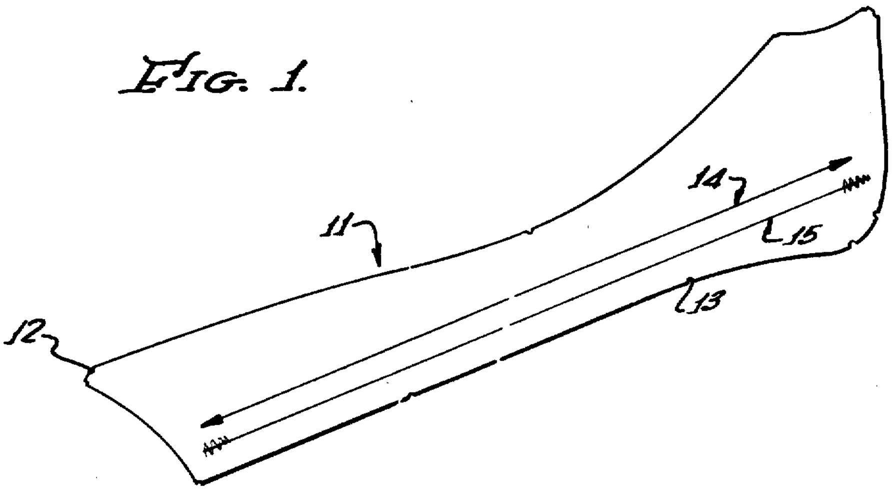
FIGURE 1 is a plot of a typical reference pattern to be graded according to the method of the invention.

Referring now specifically to the drawing and in particular to FIG. 1, there is displayed a typical plot of the reference pattern which is to be graded to provide corresponding patterns for additional sizes. For example, the pattern 11 of FIG. 1 may be part of a dress of a reference size 12. From the pattern 11 corresponding parts for the selected range of sizes such as 6, 8, 10, 14, 16 and 18 are to be produced. The pattern 11 of FIG. 1 has various control points including control points such as 12 which represent particular positions on the edges of the pattern 11 which are to be utilized as control points for proportionately increasing or decreasing the reference pattern edge.

The control points 12 of the pattern 11 may be in the form of notches and are selected to be placed at the corners or other key locations of the pattern 11. The control points 12 are utilized in the method of this invention as points from which certain dimensional distributions are to be applied to produce the additional sizes according to predetermined grading instructions. The control points 12 may be formed at any desired points along the boundary of the garment 11, and as is illustrated in FIG. 1, are formed near the corners or edges of the garment. Other control points such as 13 may be formed in the edge of pattern 11 and be utilized for purposes other than grading. A grade axis 15 is displayed on the pattern 11 to facilitate positioning of the pattern 11 on the pattern tracer 21. Additionally, there may be displayed on the plot of the pattern 11 information indicating instructions to the pattern cutter. For example, the line 14 indicates the grain line to facilitate positioning of the pattern 11 on the grain of the fabric.

Figure 2:
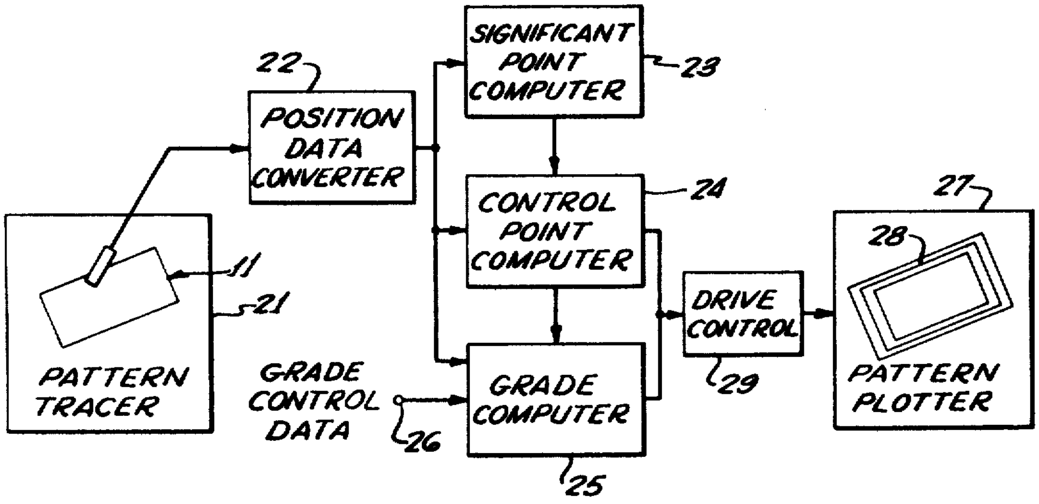
FIGURE 2 is a schematic block diagram illustrating a principal aspect of the automatic grading method of the invention.

Referring now to FIG. 2, a schematic block diagram illustrating the functional apparatus of the grading process of the invention, the reference pattern 11 of FIG. 1 is initially placed on a pattern tracer 21 which is an automatic curve follower to be described later. The tracer 21 follows the boundary of the pattern 11 including the control points 12 and 13 and provides positional incremental data based on X and Y coordinate axes to a position data converter 22. The incremental data is converted into Cartesian point data by the data converter 22 according to predetermined sequence recognition rules and, with the X–Y positional data from a significant point computer 23, is fed to a control point computer 24. The significant point computer 23 selects the Cartesian positional data from converter 22 according to maximum and minimum deviation criteria relative to the X and Y coordinate axes to provide significant point positional data indicative of the reference pattern. The control point computer 24, responsive to the Cartesian positional data from the converter 22 and the significant point data from the computer 23, computes control points. A grade computer 25 computes offset intermediate point positional data for the selected additional size patterns in accordance with the computed intermediate points for the reference pattern 11. The graded positional data from the control point computer 24 are fed to a drive control 29 which drives a pattern plotter 27 to provide a graphical display of the additional size patterns 28.

The system as illustrated in the block diagram of FIG. 2 initially is responsive to a reference size pattern 11 graphically displayed on a tracer 21 and automatically plots additional size patterns 28 on a pattern plotter 27. The process is entirely automatic with the additional size patterns 28 being automatically plotted in accordance with the data obtained from the reference pattern 11 by the tracer 21 and the grade control data fed into the grade control data terminal 26. The system as illustrated in FIG. 2 incorporates well-known digital data processing methods for providing the computation and data processing required.

*Pattern tracer*

Figure 3:
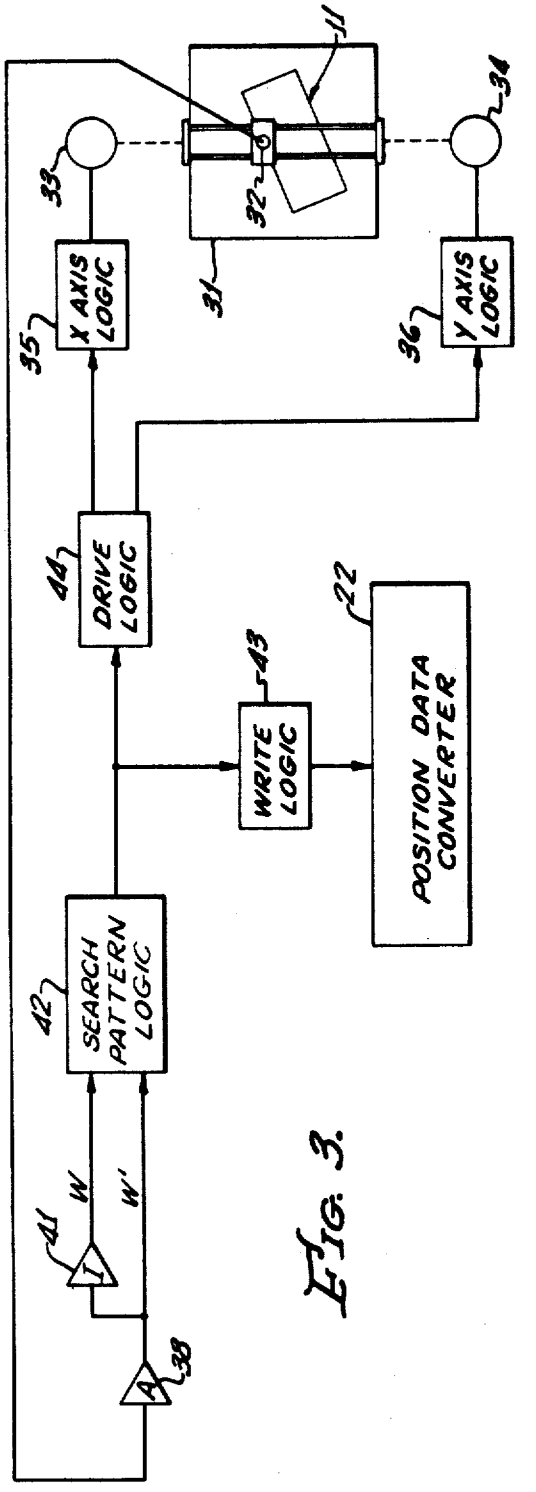
FIGURE 3 is a block diagram of the incremental curve follower system of the invention.

Referring now to FIGS. 3, 4, 5 and 6, there is illustrated the operation of the pattern tracer 21 of FIG. 2. FIG. 3 is a block diagram of an incremental pattern tracer, which may be utilized to provide the incremental positional data to the converter 22 of FIG. 2. The pattern 11 of FIG. 2 to be followed is placed on the pattern tracer 21 which may be typically a high speed, two axis digital incremental recorder primarily designed for plotting one variable as a function of another. The pattern tracer 21 incorporates such a recorder modified to replace the standard plotting pen with a scanner such as a light gun. Such scanners are well-known in the art and illustrated, for example, in Patent No. 2,816,705. The light sensing scanner sends signals to the control system of the tracer 21 indicating whether or not the boundary or edge of the pattern has been passed by the scanner during an increment or step of operation. The control system responsive thereto generates differentially valued incremental signals which control the movement of the scanner over the curve during each succeeding step. Search logic in the control system generates signals indicative of a search pattern to be followed by the scanner. The search pattern is initially set to either a clockwise or a counterclockwise scanning motion. When the scanner passes the edge of the curve the search logic causes the search pattern to change to the opposite direction. The scanner continues to follow the curve in a search pattern which alternately reverses direction until the desired curve is traveled.

The pattern tracer 21 of FIG. 2 may be, for example, as illustrated in co-pending application entitled "Automatic Curve Follower," which illustrates an incremental curve follower which may comprise the pattern tracer 21 illustrated in FIG. 2.

Referring now specifically to FIGS. 3, 4, 5 and 6, there is illustrated in schematic block diagram form the system of the incremental curve follower of the referred copending application which may be utilized as the pattern tracer 21 of FIG. 2. In FIG. 3, an incremental recorder 31 contains a replica of a curve to be followed, the curve to be followed in this invention being the reference pattern 11 itself. The recorder 31 may be a high-speed, two-axis recorder designed for plotting one variable as a function of another. Such a recorder is shown, for example, in Patent No. 3,199,111 entitled "Graphical Data Recorder System." In the incremental recorder shown in the above-mentioned patent, a recording or plot is produced by movement of a pen over the surface of a recording paper. The pen provides line segments of a predetermined line width. Any two independent axes may be used, but in the present example the axes are assumed to be orthogonal X and Y, as are most often encountered.

The incremental plotter as illustrated in the above-noted patent is modified in accordance with the co-pending application for a curve follower to provide the pattern tracer 21 for this invention with the plotting pen being replaced with a scanner 32 in FIG. 3, such as, for example, the light gun illustrated in Patent No. 2,816,705. Scanner 32 is mounted in place of the pen illustrated in the above patent, and is sensitive to differences in reflected light emanating from the plot paper, thus distinguishing between the white background and the black edge of the curve to be followed. The reference pattern 11 of FIG. 3 may be, for example, a black pattern on a white background, or vice versa. In all other aspects the plotting device 31 is identical with the incremental recorder as illustrated in the above-noted patent. In the device 31 the Y axis movement is produced by a lateral movement of a carriage mounting the scanner 32, and the X axis is produced by rotary motion of a drum holding the plot paper. The recorder 31 employs typically two bi-directional rotary step motors 33 and 34 illustrated schematically in FIG. 3 for the Y axis for driving the scanner carriage, and the other for the X axis for driving the drum. It is to be realized that the pattern tracer 31 may be of a flat-bed type with one of the step motors 33 driving the scanner carriage and the other stepping motor 34 driving the carriage along the X axis. Each digital pulse applied to the step motors from an X axis logic 35 or a Y axis logic 36 causes the pen carriage to move one increment in either a positive or a negative direction. The increments of movement or line lengths must be less than the width of the pattern to be followed and are preferably in the range of less than one-half the width of the pattern. It is to be realized that most of the patterns, such as reference pattern 11 will comply with this criterion. The electrical input signals to the stepping motors 33 and 34 from the X axis logic 35 and the Y axis logic 36 are provided so that signals of either positive or negative polarity may be used to actuate the incremental recorder 31 in each of four operating modes: drum rotation in one direction; drum rotation in the opposite direction; carriage left; and carriage right. These two groups of signals may be referred to as the X and Y axis signals. Thus, for example, an X positive signal (XP) from the X axis logic 35 causes the stepping motor 33 to rotate the drum down, while an X negative signal (XN) causes rotation of the drum up. Similarly, a Y positive signal (YP) from the logic 36 causes the carriage to move one increment in the Y positive direction, and a Y negative signal (YN) causes movement one increment in the Y negative direction. In this manner, the light sensing head 32 is controlled in incremental movements of XP and XN and YP and YN relative to the pattern on the plot proper of the tracer 31.

As the scanner 32 is being incrementally stepped in one of four directions responsive to the X and Y axes logics 35 and 36 incremental digital signals are sensed by the scanner 32. These signals from the scanner 32 are fed through the input of an amplifier 38 to the input of a search pattern logic 42 with one signal indicated as W passing through an inverter 41 and the other signal W′ being presented directly to the input of the search pattern logic 42. The signal W represents that the scanner 32 has sensed white, or one color on the paper of the recorder 31. The signal W′ indicates that the scanner 32 has sensed not white, or a different color on the recorder paper. Since the reference pattern 31 may be, for example, black, the signal W′ would indicate that the scanner 32 has sensed black on the edge of the reference pattern 31. Thus, the scanner 32 during each step of operation senses either a W or a W′. It is these two signals which are utilized in the remaining control system of the tracer 21 to provide control through the X and Y axes logics 35 and 36 to the scanner 32 to automatically cause the scanner 32 to follow the pattern 11 on the tracer 21. The search pattern logic 42 in response to the W and W′ signals develops the logical control for stepping the scanner in one of four directions and additionally provides an input to write logic 43 which provides digital incremental signals to the position data converter 22 of FIGS. 2 and 3.

A drive logic 44 is responsive to the output of the search pattern logic 42 to provide control signals to the X and Y axis logic circuits 35 and 36. The circuits in turn, through stepping motors 33 and 34 control the drum and carriage holding the scanner 32. Thus it may be seen that for each output from the scanner 32, i.e., a W or a W′, there is derived control and positional data information which controls the next step to be taken by the scanner 32. In this manner each last step of the scanner 32 is utilized to control the next step of the scanner 32 in the continual searching for and following of the given curve and each last step is fed through the write logic 43 to the position data converter 22.

It is to be realized in the system of FIGS. 3, 4, 5 and 6 that all of the control and write information signals are handled in an incremental manner as described in the patent referred to above. Thus, each step that the scanner takes in response to the control from the drive logic 44 in turn provides a signal W or W′ which is presented to the input of the search pattern logic 42 which in response thereto develops a control signal for the next step. The operation of the pattern tracer of FIG. 3 is entirely automatic with the scanner 32 initially being suitably placed in the vicinity of the reference pattern 11 of FIG. 1. From then on the scanner 32 automatically searches and finds the edge of a pattern and follows the pattern edge.

Figure 4:
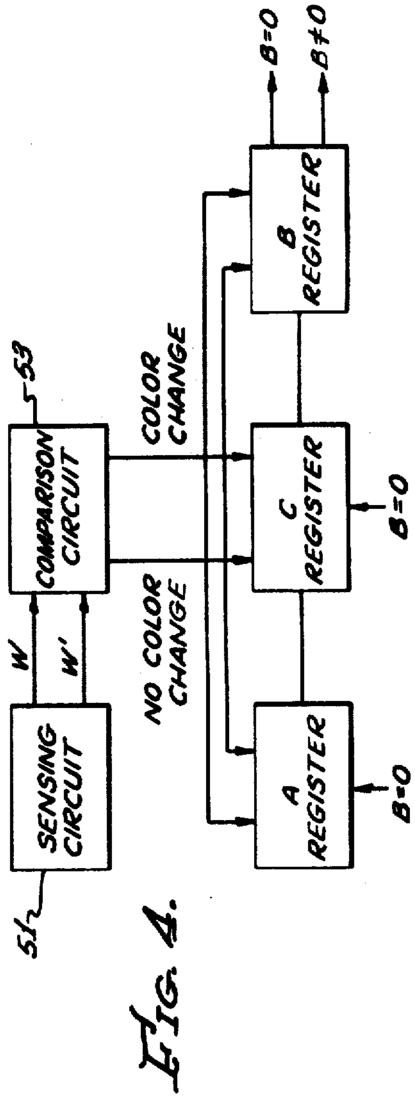
FIGURE 4 is a block diagram of the search pattern logic utilized in the system of FIG. 3.

Referring now to FIG. 4, there is illustrated in schematic block form the search pattern logic 42 of the curve follower of FIG. 3. In FIG. 4 a sensing circuit 51 responsive to scanner 32 of FIG. 3 produces either the signal W indicative of "white," or the signal W′ indicating "not white." In the described embodiment the pattern is assumed to be of a not white color such as black, and the background is assumed to be a white color. A comparison circuit 53 responsive to the signals W and W′ produces an output signal, "no color change," when during the previous step of the scanner 32 the scanner has not seen any color change, and the output signal "color change" when during the previous step the scanner 32 sees a color change either from white to black or black to white. The signals "color change" and "no color change" are each fed into a series of registers A, C, and B, which combine to generate the necessary inputs to the drive logic 44 and the write logic 43 for the system of FIG. 3. The A, C and B registers are interconnected and controlled by logical circuitry and serve to provide the logical control to produce the desired search patterns of the scanner 32 of the system of FIG. 3. In order to better understand the operation of the search pattern logic of FIG. 4, the description of the logic will be undertaken with reference to the diagram of FIGS. 6 and 7 taken with the schematic of FIG. 4. Additionally, the following logical equations are definitive of the input signal patterns which determine the operating states of the various logical circuitry and flip-flops included in the A, C and B registers of the search pattern logic 42. The logical equations can be used to provide the wiring interconnections thereto, and for that reason no further circuitry is shown on the drawings. Conventional logical notation is employed with the prime denoting the complement output term. In addition to the logical equations for the A, B and C registers, certain primary logical terms are also included which will be better understood as the description follows:

A register:

$0A = WAG + ADV$ $1A = WAGB00 + \text{Reset}$

B register:

$0B_1 = WDG + WAGB00' + \text{Reset}$ $1B_1 = WAG(B00' + B00B_1'C_1)$ $0B_2 = WDG + WAGB00'B_1'$ $1B_2 = WAG(B00'B_1' + B00C_2)$ C register:

$0C_1 = ADV + \text{Reset}$ $1C_1 = WDG + ADV$ $0C_2 = WDG + C_1ADV$ $1C_2 = C_1ADV$

W:

$W$=Scanner Senses "White," one color.

$W'$=Scanner Senses "Not White," another color.

WP:

$OWP = W'$ $1WP = W$ $WAG$ (No Color Change) $= W'WP' + WWP$ $WDG$ (Color Change) $= WWP' + W'WP$ $ADV = WAGB_2'B_1'A$ $B00(B=0) = B_1'B_2'$ $B00'(B \neq 0) = B_1 + B_2$ It is to be realized that in the control of the system according to the logical equations above and those to be included below, means are utilized to control the timing of operation by providing a precision clock signal to each gate and logic term. Such means are well known in the art and are therefore deleted here for clarity. The timing means illustrated in the co-pending application referred to above may be utilized.

Figure 6:
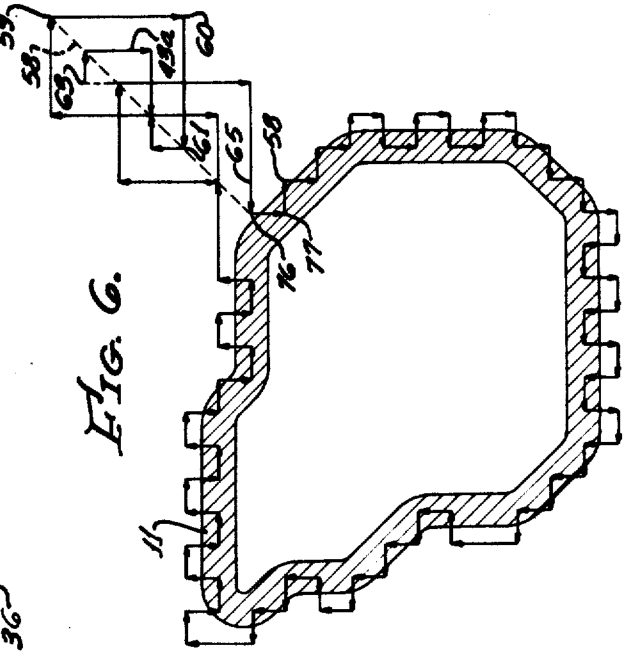
FIGURE 6 is a diagrammatic illustration of the manner in which the curve follower mechanism actually follows a typical curve.
Figure 7:
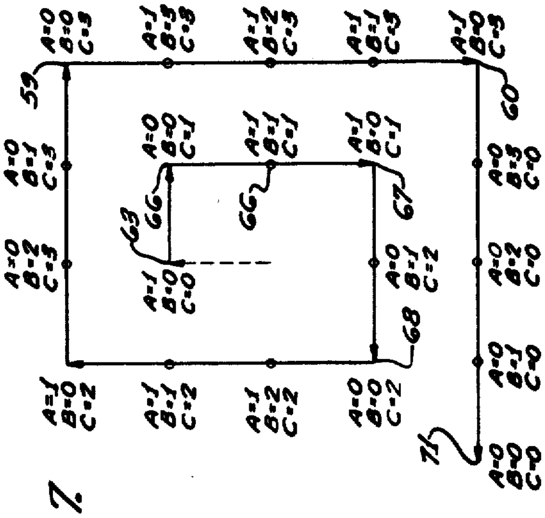
FIGURE 7 is a blown up representation of a portion of the tracing pattern of FIG. 6, particularly illustrating the operation of the A, B and C registers during operation.

Now, turning to the diagrammatic views of FIGS. 6 and 7 taken in connection with the block diagram of FIG. 4, FIG. 6 illustrates a diagrammatical view of a pattern 11, which corresponds to the reference pattern 11 of FIG. 2. The curve 52 is a continuous curve describing a closed region, with the shaded area indicating the curve itself. The scanner 32 of the system of FIG. 3 may initially be placed either inside the curve or outside the curve, and for explanation purposes it will be assumed that the scanner 12 is initially placed at the point 63, selected to be somewhere in the general vicinity of a point on the pattern 11. As may be seen from the diagram of FIG. 6, the scanner 32 of the device of FIG. 1 generates a rectangular spiral pattern beginning from the point 63 as the scanner searches for the edge of the pattern 11. As the spiral is being generated, the A, B and C registers (FIG. 4) are controlled by the logic to control the direction and distance traveled by the scanner 32. The generated spiral illustrated in FIG. 6 consists of a limited rectangular spiral having leg lengths of N increments, wherein N increases by one count for each two changes in direction along the spiral. The A register controls the number of legs per sequence, the B register counts increments stepped per leg and indicates the increments still to be stepped, and the C register indicates the total increments per leg of the sequence. A leg is defined as a line of N increments (point 59 to 60), and a sequence is defined as two legs in sequence, each having the same number of increments (the legs 59–60 and 60–61). As seen in FIG. 6, the scanner 32 initially starts at the arbitrarily selected point 63, and then searches for the edge of the pattern 52 in a rectangular spiral pattern. The number of increments for each leg of the spiral increases by one each time a sequence is completed, and the number continues to advance until a selected maximum number is reached, at which time the scanner commences a new spiral. The new spiral is displaced diagonally from the previous spiral as indicated by the line 58 in FIG. 6, causing the search pattern to search in a given direction from the point 63 as illustrated in FIG. 6. The scanner 32 continues to search in a series of processing spiral patterns until the scanner 32 senses the edge of the pattern 11 at point 65 in FIG. 6. A W′ signal and a WP signal generate a WDG (color change) signal in the search pattern logic indicative of a color change. The search pattern logic responsive to the color change then initiates controls which cause the scanner 32 to commence a new spiral pattern of opposite rotation to follow the edge of the pattern 11 until the next color change is sensed, and so forth until the entire perimeter has been traversed.

For a better understanding of the initial spiral pattern described by the scanner 32 of FIG. 3, starting from point 63 as illustrated in FIG. 6, the view of FIG. 7 may now be described. In FIG. 7 the initial spiral pattern emanating from point 63 of FIG. 6 is shown. Taking the diagram of FIG. 7 along with the logical equations for the A, B and C registers described above, the operation of the scanner 32 during the spiral search pattern may be readily understood. The A register is initially set by a "Reset" signal to 1, and with B and C registers are set equal to zero. The scanner 12 then steps from point 63 to point 66, thus describing one increment in the X positive (XP) direction. At the end of the increment at point 66, the scanner 32 provides either a W or a W′ signal to the comparison circuit 53 of FIG. 4.

The A register which counts the number of legs per sequence either is at one ($A$=true) or zero ($A'$=true). The A register switches from one to zero when the output of the B register is a $B=0$ signal, and the A register switches from zero to one when the previous output of the A register is zero. The A register at one (A) indicates that the scanner 32 is in the first leg of a sequence, and at zero (A') that the scanner 32 is on the second leg of a two leg sequence. Thus, for example, at point 63 where the A register is one (A) there is an indication that the scanner 32 is on the first leg of the sequence and at point 66 where $A=0$ (A') the scanner 32 is on the second leg of a two leg sequence.

The C register is responsive to the A register and the comparison circuit 53 of FIG. 3 contains a count of the number of increments per leg. In the logic described, when C is equal to zero there is one increment per leg. When C is equal to one there are two, and so on. In the example illustrated in FIG. 7 at point 63 C is equal to zero, indicating that there is one increment per leg during the present sequence of two legs. At point 66 C is equal to one, indicating that there are two increments per leg. Thus the next sequence commencing at point 66 and ending at point 68 would have two legs of two increments per leg, thereby adding one increment per leg to the previous sequence.

The B register at the beginning of each sequence copies the number from the C register and then counts it down. When $B=0$ (logic term B00) the end of a leg of a sequence has been reached. For example, at points 66, 67 and 68, $B=0$ since an end of a leg has been reached at each of these points. The B register signal is then sent to the A register to control the drive logic 44 to generate a CW or CCW pulse, to be described in more detail below. Thus it may be seen that the A, C and B registers in accordance with the logical equations illustrated cause the scanner 32 to search in a spiral pattern as illustrated in FIGS. 6 and 7. The spiral pattern beginning from point 63 describes one leg per sequence, then two legs per sequence, and so on until point 71 is reached.

At point 71 a new spiral search pattern is commenced diagonally displaced from the first search pattern, thus continuing from point 71 in FIG. 7. The spiral continues until at point 65 the scanner 32 crosses the edge of the pattern 11. The scanner 32 then senses a color change and at point 76 the scanner 32 commences a new search pattern. Initially, commencing at point 63, the search pattern was in a clockwise direction (CW). At point 76 the scanner 32 commences a search pattern in a counterclockwise direction (CCW).

Figure 5:
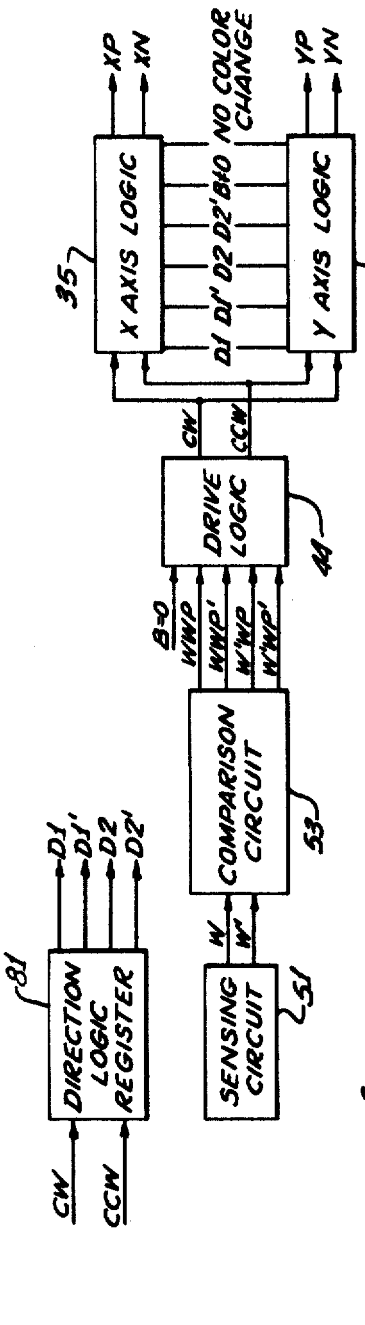
FIGURE 5 is a block diagram of the drive logic utilized in the system of FIG. 3.

Referring now to FIG. 5, a schematic plot diagram of the drive logic 44 illustrated in the system of FIG. 3, it may be seen that the scanner 32 of FIG. 1 is controlled in the search patterns illustrated in FIGS. 6 and 7 according to the schematic diagram of FIG. 5 taken with the following logical equations:

Direction Logic Register:

$$0D_1=D_2CW+D_2'CCW$$
$$1D_1=D_2'CW+D_2CCW$$
$$0D_2=D_1CCW+D_1'CW$$
$$1D_2=D_1'CCW+D_1CW$$

Clockwise Search:

$$CW=WWP'+(WWP)(B00)$$

Counterclockwise Search:

$$CCW=W'WP+(W'WP')(B00)$$

$$\underline{XP}=DL0CW+D2'D1B00'WAG+D2D1CCW$$
$$\underline{YP}=DL0B00'WAG+D2'D1CCW+D2D1'CW$$
$$\underline{XN}=DL0-CCW+D2D1CW+D2D1'B00'WAG$$
$$\underline{YN}=D2'D1CW+D2D1B00'WAG+D2D1'CCW$$
$$\underline{DL0}=D_2'D_1'$$

In FIG. 5 the sensing circuit provides W and W' signals to the comparison circuit 53 which supplies the signals WWP, WWP', W'WP and W'WP' to the drive logic 44. The output of the drive logic 44 is either a CW signal or a CCW signal, which are both fed to the X axis logic 35 and Y axis logic 36. In addition to the CW and CCW signals the logics 35 and 36 receive logical signals from the output of the direction logic 61. A direction logic 81 basically is responsive to the CW and CCW signals from the drive logic 44 and provides output logic signals indicative of the position of the last step of the scanner 32. The signals from the direction logic 81 are fed to the X and Y logics 35 and 36, which combine to provide the output signals XP and XN for the X axis logic 35, and signals YP and YN for the Y axis logic 36. These four signals control the step motors 33 and 34 of FIG. 3 which are coupled to control the carriage and the drum to provide a proper movement of the scanner 32 in relation to the paper on the recorder 11.

*Grading method*

Figure 8:
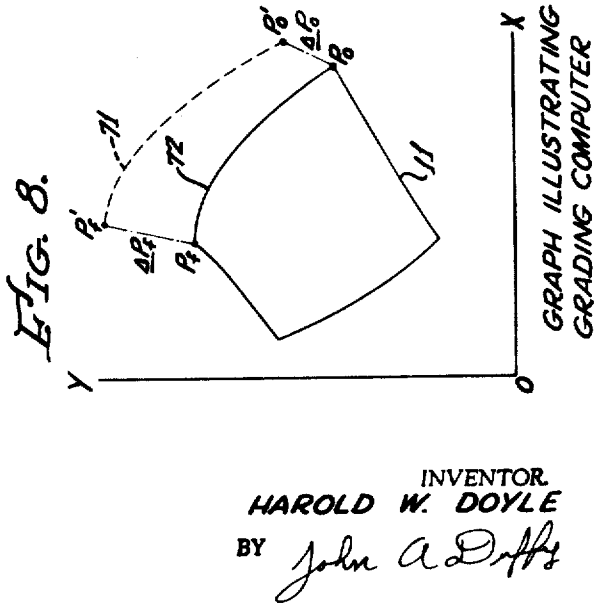
FIGURE 8 illustrates a reference pattern with the grading of one edge.

Before proceeding to a description of the operation of the system as illustrated in FIG. 2, a brief description of the principles governing the grading operation will be provided. FIGS. 8, 9, 10 and 11 are graphical illustrations of the process for converting a reference pattern 11 as illustrated in FIG. 2 to the additional size patterns 28 as illustrated in FIG. 2. In the illustration of FIG. 8 the grading of the pattern 11 is shown only for the edge of the pattern between the two grade control points $P_o$ and $P_f$, realizing that grading is accomplished in the same manner for the remaining edges of the pattern 11. The pattern 11 may be considered to be positioned in relation to standard X and Y grade axes as illustrated in FIG. 8. The grade control points $P_o$ and $P_f$ are established in a predetermined manner with grade control instructions providing the X and Y coordinate distances of each of the additional size grade points from the reference points $P_o$ and $P_f$. For example, as illustrated in FIG. 8, an additional size pattern will have the offset grade points $P_o'$ and $P_f'$ referenced to the corresponding grade points $P_o$ and $P_f$ of the reference pattern 11. Thus, in the computation of the data describing the boundary of the additional size pattern, the offset control points $P_o'$ and $P_f'$ will be on the boundary of the additional size pattern.

Grading in the example illustrated in FIG. 8, from the reference size pattern 11 to the new size having offset control points $P_o'$ and $P_f'$, is accomplished automatically by the system as illustrated in FIG. 2 with the graphical illustration of FIGS. 8–11 illustrating the manner in which the process is accomplished. In FIG. 8 the grade control points $P_o$ and $P_f$ are established by the control point computer 24 of FIG. 2 with the points $P_o$ and $P_f$ having the X and Y coordinates as illustrated in the diagram of FIG. 8.

In order to accurately maintain the esthetic and design features personnally constructed by the designer in the reference pattern, grading is accomplished by a precisely mathematical porportioning. In FIG. 8, the reference pattern 11 is the pattern initially designed for a given reference size. From the pattern 11 data representing additional size patterns must be computed. In addition to the reference pattern 11 the designer also provides grading instructions which include the offset distances in the X and Y axes of the grade control points for the additional sizes corresponding to the grade control points for the reference pattern. Thus, in FIG. 8 the grade points $P_o$ and $P_f$ for the reference pattern 11 are established from the data furnished by the pattern tracer 21 of FIG. 2, and the grade points $P_o'$ and $P_f'$ for a desired additional size pattern are established from the offset vectors $\underline{\Delta P_f}$ and $\underline{\Delta P_o}$ furnished to the grade computer 25 of FIG. 2. In other words, the designer provides pattern control data defining the offset vectors $\underline{\Delta P_o}$ from $P_o$ to $P_o'$ and $\underline{\Delta P_f}$ from $P_f$ to $P_f'$. In this manner the grade points $P_o'$ and $P_f'$ for the desired additional size are established. In order to provide the desired proportional grading it is necessary to produce a curve 71 between $P_o'$ and $P_f'$ which is proportional to the curve 72 of the reference pattern 11. Since the curve 72 is typically non-linear and not definable by any mathematical equations, the proportional grading must be accomplished in an empirical manner. The system of this invention proportionally grades the curve 72 in accordance with the offset vectors $\underline{\Delta P_o}$ and $\underline{\Delta P_f}$ to produce the offset curve 71.

Figure 10:
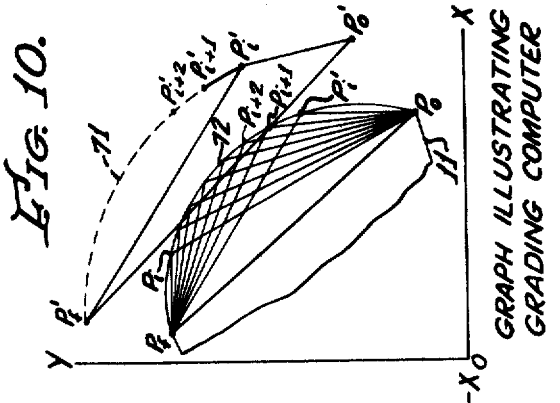
FIGURE 10 is a still more detailed analysis of the grading process for the garment edge of FIGS. 8 and 9.
Figure 9:
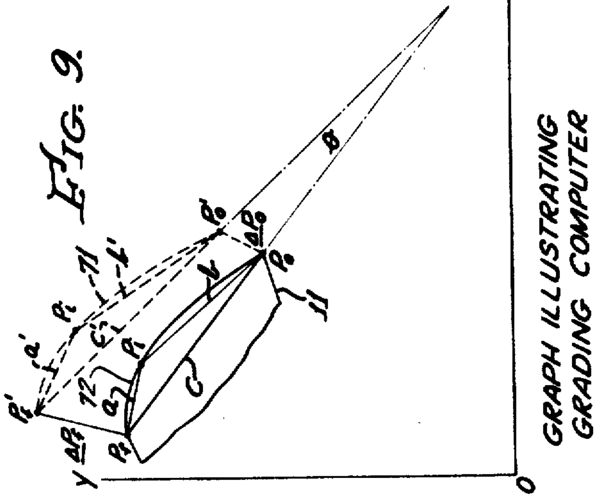
FIGURE 9 is a more detailed illustration of the grading process for the one edge of the reference pattern illustrated in FIG. 8.

In order to provide positional data indicative of the curve 72, the device of this invention computes intermediate points on the curve 72 in a manner to be described in conjunction with the graphical display of FIGS. 9 and 10. Basically, the manner for computing positional data to establish the curve 71 of FIG. 8 is based on the geometric similarities of triangles constructed on the curves 72 and 71. It is a well-known mathematical principle that two triangles having equal angles have sides which are proportioned according to geometric equations. For example, in the graphical display of the plotter 11 illustrated in FIG. 9 the triangle described by $P_o$, $P_f$ and $P_i$, wherein $P_i$ is an arbitrary intermediate point on the curve 72, has sides *a*, *b* and *c*. Utilizing the sides *a*, *b* and *c* of the triangle $P_oP_fP_i$, the corresponding sides $a'b'c'$ are computed and the triangle $P_o'P_f'P_i'$ is constructed thereby establishing an offset point $P_i'$ of the curve 71. Thus, the offset point $P_i'$ on the curve 71 corresponds to the point $P_i$ on the curve 72. The entire curve 71 may be established by computing the location of points on the curve 71 derived from intermediate and end points on the curve 72 such as $P_i$ and $P_o$ and $P_f$ respectively. The specific mode of computation will now be discussed in conjunction with FIG. 10. In order to provide true proportionality, it is desired to compute the triangle $P_o'P_f'P_i'$ to be equiangular to the known triangle $P_oP_fP_i$. The manner of computing the point $P_i$ is in accordance with known geometrical principles based on the rotation and translation of the triangle whose sides are *a*, *b*, *c*.

Assuming that the triangles with vertices $P_o$, $P_f$, $P_i$ and $P_o'$, $P_f'$ $P_i'$, and with sides *a*, *b*, *c*, and *a'*, *b'*, *c'*, respectively, are similar triangles, then $$\frac{c'}{c}=\frac{b'}{b}=\frac{a'}{a} \qquad (1)$$

i.e., the corresponding sides are proportional.

Further, assuming that the corresponding sides of the similar triangles, represented now as vectors, are rotated from one another, through an angle $\theta$, then according to vector analysis:

$$\underline{c}\times\underline{c}'=cc'\sin\theta \text{ (vector product)} \qquad (2)$$

$$\underline{b}\times\underline{b}'=bb'\sin\theta \text{ (vector product)} \qquad (3)$$

$$\underline{c}\cdot\underline{c}'=cc'\cos\theta \text{ (scalar product)} \qquad (4)$$

$$\underline{b}\cdot\underline{b}'=bb'\cos\theta \text{ (scalar product)} \qquad (5)$$

Then, from Equations 2, 3, 4 and 5

$$\sin\theta=\frac{\underline{c}\times\underline{c}'}{cc'}=\frac{\underline{b}\times\underline{b}'}{bb'} \qquad (6)$$

And $$\cos\theta=\frac{\underline{c}\cdot\underline{c}'}{cc'}=\frac{\underline{b}\cdot\underline{b}'}{bb'} \qquad (7)$$

Substituting Equation 1 in both Equations 6 and 7 to eliminate the magnitudes $b'$ and $c'$, $$\frac{\underline{c}\times\underline{c}'}{c^2}=\frac{\underline{b}\times\underline{b}'}{b_2} \qquad (8)$$

And $$\frac{\underline{c}\cdot\underline{c}'}{c^2}=\frac{\underline{b}\cdot\underline{b}'}{b^2} \qquad (9)$$

Resolving the vector and scalar products of $\underline{b}$ and $\underline{c}$ according to vector analysis into their X and Y components produces:

$$\underline{c}\times\underline{c}'=c_xc_y'-c_yc_x' \qquad (10)$$

$$\underline{b}\times\underline{b}'=b_xb_y'-b_yb_x' \qquad (11)$$

$$\underline{c}\cdot\underline{c}'=c_xc_x'+c_yc_y' \qquad (12)$$

$$\underline{b}\cdot\underline{b}=b_xb_x'+b_yb_y' \qquad (13)$$

Substituting the relations of Equations 11 and 13 into Equations 8 and 9:

$$b_xb_y'-b_yb_x'=\frac{(b^2)(\underline{c}\times\underline{c}')}{c^2} \qquad (14)$$

$$b_xb_x'+b_yb_y'=\frac{(b^2)(\underline{c}\cdot\underline{c}')}{c^2} \qquad (15)$$

Solving for $b'$ in terms of its X and Y components $b_x'$ and $b_y'$, $$b_x'=\frac{(b_x)(\underline{c}\cdot\underline{c}')-(b_y)(\underline{c}\times\underline{c}')}{c^2} \qquad (16)$$

$$b_y'=\frac{(b_y)(\underline{c}\cdot\underline{c}')+(b_x)(\underline{c}\times\underline{c}')}{c^2} \qquad (17)$$

Since, by definition:

$$\underline{b}'=\underline{P}_i'-\underline{P}_o' \qquad (18)$$

and $$\underline{P}_o'=\underline{P}_o+\Delta\underline{P}_o \qquad (19)$$

then $$P'_{ix}=P_{ox}+\Delta P_{ox}+b_x' \qquad (20)$$

$$P'_{iy}=P_{oy}+\Delta P_{oy}+b_y' \qquad (21)$$

Substituting Equations 16 and 17 in the Equations 20 and 21:

$$P'_{ix}=P_{ox}+\Delta P_{ox}+\frac{(b_x)(\underline{c}\cdot\underline{c}')-(b_y)(\underline{c}\times\underline{c}')}{c^2} \qquad (22)$$

$$P'_{iy}=P_{oy}+\Delta P_{oy}+\frac{(b_y)(\underline{c}\cdot\underline{c}')+(b_x)(\underline{c}\times\underline{c}')}{c^2} \qquad (23)$$

Substituting Equations 2 and 4 into Equations 22 and 23:

$$P'_{ix}=P_{ox}+\Delta P_{ox}+\frac{c'}{c}(b_x\cos\theta-b_y\sin\theta) \qquad (24)$$

$$P'_{iy}=P_{oy}+\Delta P_{oy}+\frac{c'}{e}(b_y\cos\theta+b_x\sin\theta) \qquad (25)$$

$P'_{ix}$ and $P'_{iy}$ are then the *x* and *y* coordinates of $P'_i$ and a point of the curve 71 has been located. In the same manner as many additional points as desired, such as $P'_{i+1}$, $P'_{i+2}$, etc., may be computed from corresponding points such as $P_{i+1}$ until the entire offset curve 71 is located.

Thus as seen in FIG. 9 which illustrates the computation for $P'_i$ and in the graphical illustration of FIG. 10 which illustrates the computation for $P'_{i+1}$, etc., all of the $P'_i$ points are computed according to the Equations 24 and 25 with the resultant $P'_i$ values being indicative of the curve 71 between $P'_o$ and $P'_f$. In this manner, a true proptional grading is obtained with the curve 71 between $P'_o$ and $P'_f$, being a highly accurate proportional grading from the intial curve 72. Each of the edges of the pattern 11 to be graded have the grade for the additional sizes determined in the same manner as illustrated for the single edge shown in FIGS. 8, 9 and 10.

Figure 11:
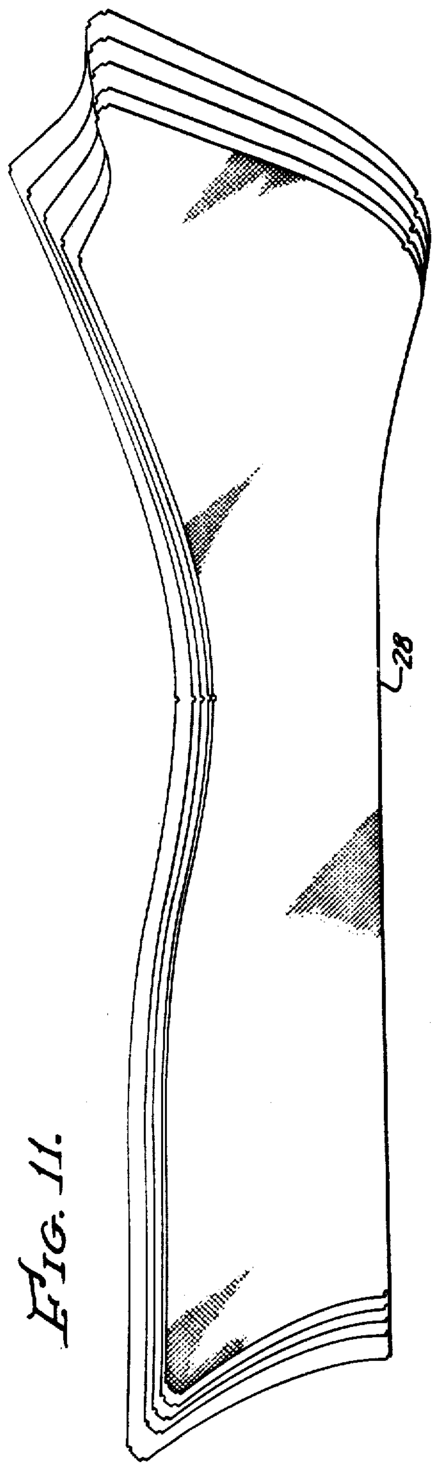
FIGURE 11 illustrates the plot of the stacked grades resulting from the grading operation applied to the reference pattern.

Referring now to FIG. 11, there is illustrated in graphical form a plot of the additional size patterns that have been computed and plotted in accordance with the analysis described above as illustrated in FIGS. 9 and 10. Thus the grade computer 25 illustrated in FIG. 2 computed the X, Y positional values of the graded offset points of each of the patterns as illustrated in FIG. 11.

*Position data converter*

Figure 12:
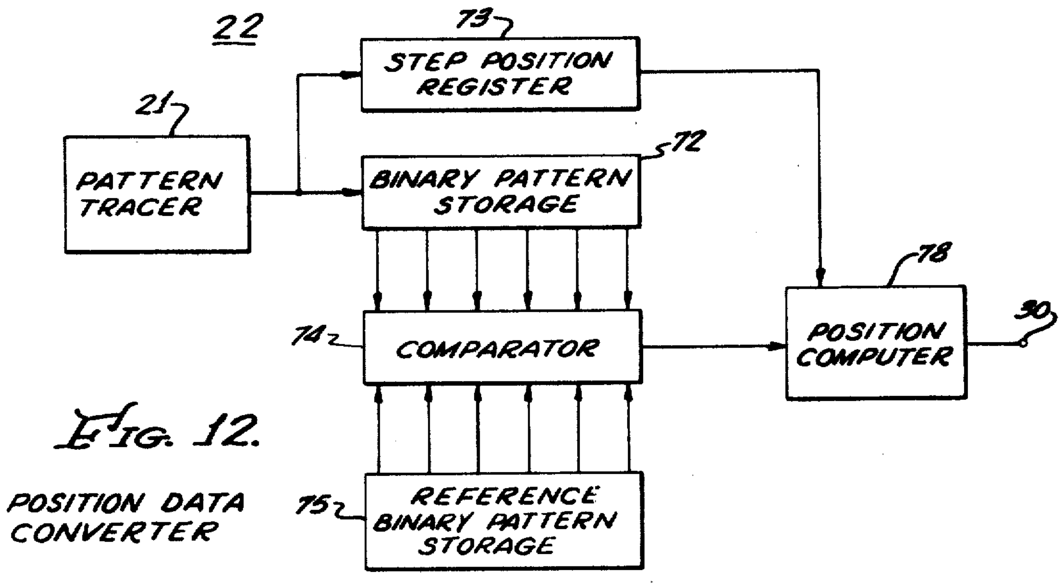
FIGURE 12 is a schematic block diagram of the position data converter of FIG. 2.

Referring now to FIG. 12, there is illustrated in schematic block form the position data converter 22 of FIG. 2. The data converter 22 is responsive to output incremental data from the pattern tracer 21, and provides positional information in the form of X–Y positional data to the significant point computer 23, the control point computer 24, and the grade computer 25 of FIG. 2.

As previously described, the output of the pattern tracer 21 of FIG. 2 is in the form of incremental data, or steps. The position data converter of FIG. 12 converts this incremental data into X–Y positional data. The manner in which this is accomplished is illustrated in FIG. 12 wherein the pattern tracer 21 provides incremental step data to a binary pattern storage 72 and to a step position register 73. The binary pattern storage 72 serves to store essential step increment information in binary form, with the step position register 73 serving to accumulate each of the individual steps as they are received from the pattern tracer 21. Both the register 73 and the binary pattern storage 72 may be storage registers. The binary sequence in the pattern storage 72 is compared in a comparator 74 with predetermined binary sequences stored in a reference pattern storage 75. The comparator 74 detects coincidence between an actual binary sequence stored in the pattern storage 72 and a predetermined binary sequence stored in the reference pattern storage 75, and provides an output to a position computer 78 which utilizes the information from the step position register 73 to compute the representative position of the accumulated position data and feeds the output from the terminal 30 to the significant point computer 23, the control point computer 24, and the grade computer 25.

Figure 13:
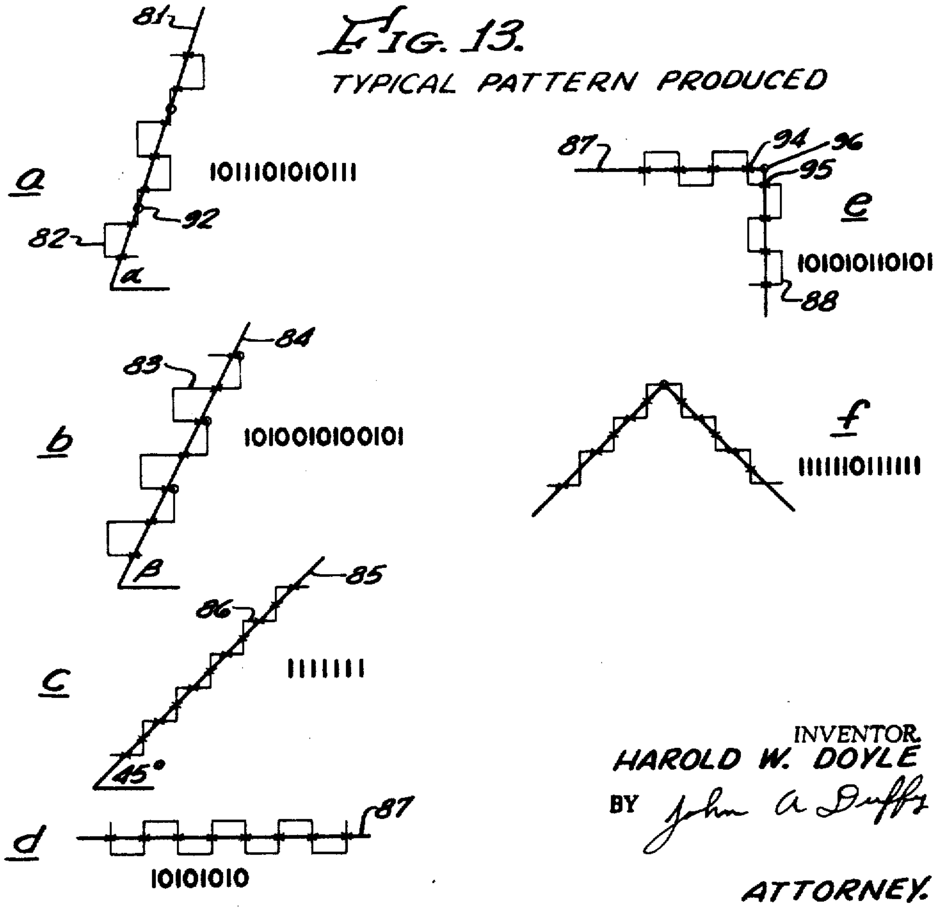
FIGURE 13 is a graphical illustration of the typical incremental patterns produced by the position data converter of FIG. 12.
Figure 14:
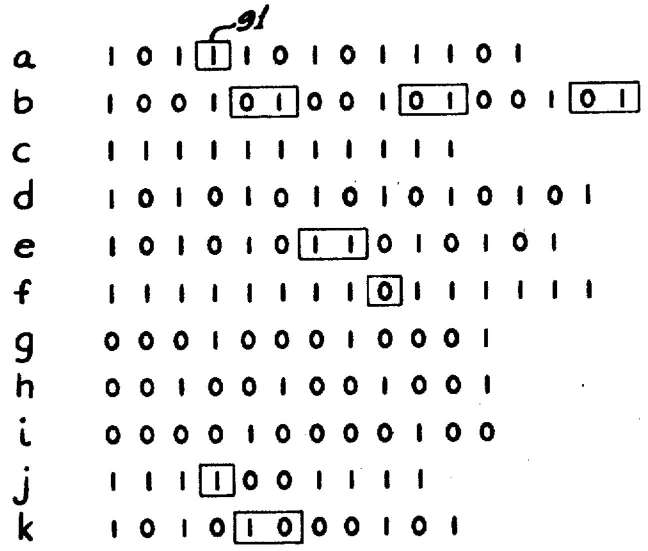
FIGURE 14 is a table of the binary sequences received by the position data converter of FIG. 12.

The pattern tracer 21 produces incremental step movements as seen for example in FIG. 13 which basically fall into a certain number of sequences which have been determined by inspection of actual movements and are stored in the reference pattern storage 75 in FIG. 12. These patterns may comprise the step sequences illustrated in FIG. 13 wherein, for example, FIG. 13*a* shows an outline 81 of the edge of a pattern in which the outline 81 is at an angle $\alpha$ with the horizontal. Other sequences. are illustrated in FIGS. 13*b* to 13*f*. These sequences have been found through experimentation to be representative of the step patterns that will be produced during the tracing of a typical pattern such as illustrated in FIG. 1. Each of the patterns **13*a*–13*f* produces a series of crossings of the pattern edge which in turn provide binary sequences as displayed in the table of FIG. 14, and as shown adjacent to each step sequence of FIG. 13. For example, for the outline 81** of FIG. 13*a* the step pattern 82 is the path followed by the pattern tracer 21 of FIG. 1 as the tracer follows the outline 81. When a step of the pattern 82 crosses the outline 81 (noted by *x*'s), a binary 1 is produced, and when a step of the pattern 82 does not produce a crossing, a binary 0 is produced. Thus, the pattern 82 produces the binary crossing sequence 1011101011101 as illustrated in FIG. 14. It has been found that for an outline such as 81 in which the tangent of $\alpha$ is 3 or ⅓, the binary pattern of FIG. 14*a* will be produced. Similarly, the binary pattern 83 in FIG. 13*b* will produce a sequence of binary ones and zeros as illustrated in FIG. 14*b*. The outline 84 in 13*b* representing the pattern edge is a line at an angle $\beta$, whose tangent is 2, or ½. In FIG. 13*c* an outline 85, having an angle with the horizontal of 45°, produces a sequence as shown in FIG. 9*c* with the step pattern 86. The sequence in FIG. 14*c* consisting entirely of binary 1's is produced from the pattern 86 since each incremental step of the tracer crosses the line 85, thereby producing at each step a binary 1 according to the output of the pattern tracer 21. In FIG. 13*d* wherein the line 87 representing the pattern edge is a horizontal line, a binary crossing pattern of alternate 1's and 0's is produced as illustrated in FIG. 14*d*, since alternately the incremental steps of the tracer 21 produce a change in color and no change in color. FIGS. 13*e* and 14*e* illustrate the crossing sequence produced when a horizontal outline 87 meets a vertical outline 88 at a corner. It is to be noted that the line 88 in FIG. 13*e* essentially produces a binary sequence identical to the horizontal line 86 of FIG. 13*d*.

The pattern illustrated in FIG. 13*e* produces the sequence of FIG. 14*e* which is similar to the sequence of 14*d* with the exception that when the corner is passed a different pattern is produced. Thus, as illustrated in FIG. 14*e* the binary bits enclosed by the box 88 represent the corner between the outlines 87 and 88 of FIG. 13*e*.

In each of the various step patterns illustrated by the outlines in FIG. 13 and the binary sequences of FIG. 14, the comparator 74 of FIG. 12 upon agreement with one of the patterns in FIG. 14 and a stored pattern in the reference storage 75 provides an output to the position computer 78 of FIG. 12. The comparator 74 is designed to compare a predetermined number of binary bits in the sequences furnished from the pattern storage 72 with the sequences furnished from the reference storage 75. For example, in the sequence of FIG. 14*a* the binary 1 enclosed by the box 91 represents the edge point 92 of FIG. 13*a*, which is put out as a point determining the pattern outline. The binary number 1 enclosed by 91 is utilized by the comparator 74 of FIG. 12 as a reference to the step position register to obtain the coordinates of the point representative of the binary 1 enclosed by the box 91. Likewise, in FIG. 14*e* the binary number enclosed by the box 93 corresponds to the crossings 94 and 95 and the representative corner point 96 illustrated in FIG. 13*e*.

*Significant point computer*

Figure 15:
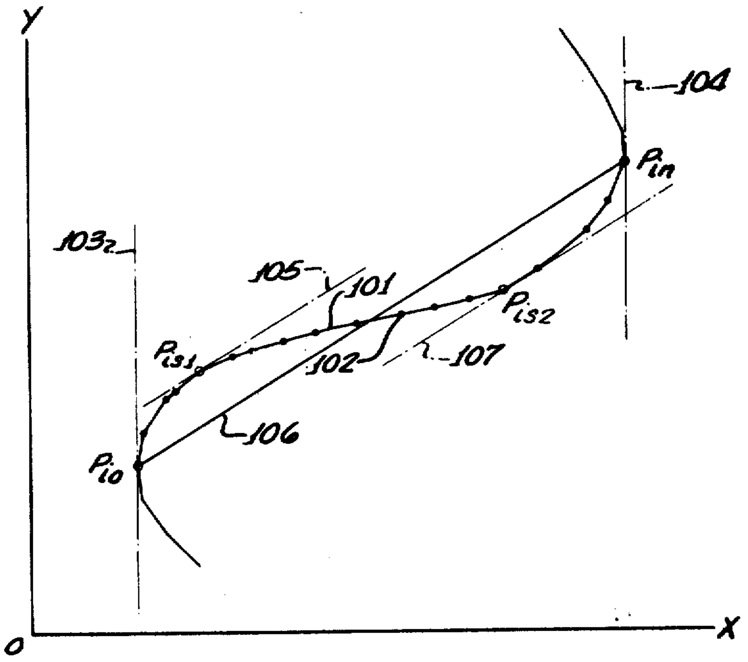
FIGURE 15 is a graph illustrating the operation of the significant point computer of FIG. 2.
Figure 16:
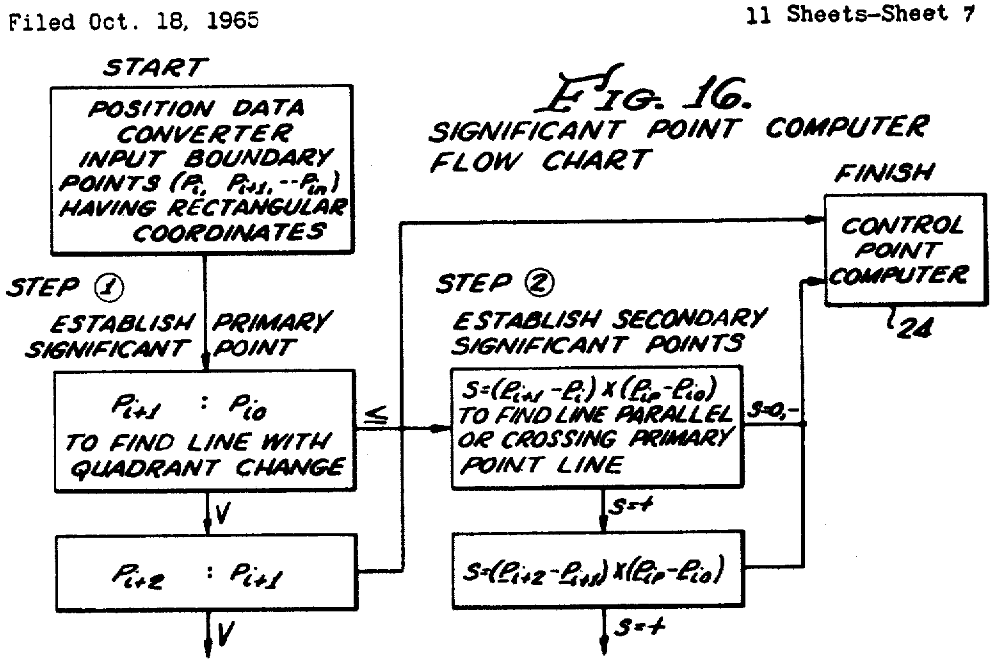
FIGURE 16 is a flow chart of the significant point computer 23 of FIG. 2.

Referring now to FIG. 15, there is illustrated in graphical form the points selected by the significant point computer 23 of FIG. 2. FIG. 15 shows a portion 101 of the pattern 11 of FIG. 2. The output of the position data converter 22 into the significant point computer 23 is a series of raw boundary data points such as 102 on the line 101. The significant point computer 23 analyses the raw boundary data points from the position data converter 22 to provide significant points such as illustrated in FIG. 15 wherein significant points $P_{10}$ $P_{is1}$ $P_{is2}$ and $P_{1n}$ are shown. These significant points are computed in the significant point computer 23 according to predetermined algorithms as illustrated in the flow chart of FIG. 16. Initially, in step 1 as shown in FIG. 16, a primary significant point $P_{1o}$ is established. The next primary significant point $P_{1n}$ is established according to the flow chart of FIG. 16 wherein initially $P_{1+1}$ (the first raw boundary point after $P_{1o}$) is compared with $P_{1o}$ to find a directed line segment which changes quadrants. For example, by a line quadrant change is meant the first point at which a line drawn tangent to the curve 101 at that point changes quadrants. Thus the line 103 drawn tangent to the curve 101 at $P_{1o}$ is parallel to the Y axis and therefore signifies that a quadrant change will be made by the next line segment. Thus, $P_{1o}$ is a primary significant point. Similarly, $P_{1n}$ is a primary significant point since the line 104 drawn tangent to the curve 101 at the point $P_{1n}$ is parallel to the Y axis.

After the primary significant points $P_{1o}$ and $P_{1n}$ are established, step 2 in FIG. 16 is commenced to select the secondary points $P_{is1}$ and $P_{is2}$. The secondary points are selected by drawing a line between each of the raw boundary points until the slope of one of such lines, 105 for example, passes from less than to greater than the slope of a line 106 drawn between the primary points $P_{1o}$ and $P_{1n}$. Similarly, the secondary point $P_{1s2}$ is determined by the line 107, whose slope is equal to the slope of the line 106. In this manner, as illustrated in the flow chart of FIG. 16 and the graph of FIG. 15, the significant points of the pattern 11 of FIG. 2 are determined by the significant point computer 23. The primary and secondary significant points from the computer 23 are then fed to the control point computer 24 in FIG. 2.

*Control point computer*

Figure 17:
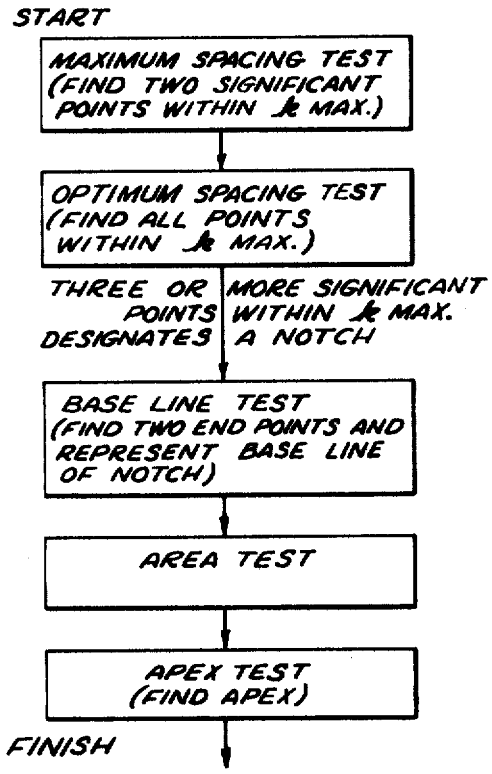
FIGURE 17 is a flow chart of the control point computer of FIG. 2 illustrating briefly the several tests utilized to calculate the control points obtained from the reference pattern.
Figure 18:
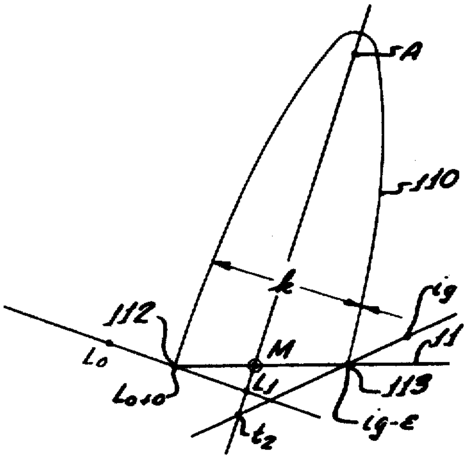
FIGURE 18 is a graph illustrating in blown-up form a typical control notch on the reference pattern of FIG. 1.

The control point computer 24 accepts raw boundary data from the position data converter 22 and significant point data from the computer 23 and provides control points according to the control notches established on the pattern 11 in FIG. 2. The operation of the control point computer 24 is illustrated in the form of flow charts in FIGS. 17, 19–23, and in the illustrated graph of FIG. 18. As previously pointed out, the pattern 11 contains a number of notches as shown in FIG. 18, which are used as control points for the grading computation. A typical notch, as illustrated in FIG. 18, has a depth which may be, for example, 3/16 of an inch and a width of 1/16 of an inch, and is typically cut out of the edges of the pattern 11 as desired with a punch. As the pattern tracer 21 of FIG. 2 traces the outline of the pattern 11, it also traces the outline of the notch along the curve 110 of FIG. 18. In order for the control point computer 24 to establish that a notch has been traced, it is necessary to analyse the data from position data converter 22 and significant point computer 23. This analysis comprises, as generally illustrated in the flow chart of FIG. 17, a series of tests. In the beginning, a maximum spacing test is made in which two significant points are found which are within the maximum distance allowable ($k_{max}$). After two significant points are found within the $k_{max}$ then an additional spacing test is conducted in which all points within the distance of the $k_{max}$ are established. If three or more significant points are within the $k_{max}$, then a notch is tentatively designated and a further series of tests is conducted. A base line test is conducted to find two end points 112 and 113 which represent the base line of the notch, from which is determined the midpoint M. An apex test finds the apex A, after which a line is determined from M to A as illustrated in FIG. 18.

Figure 19:
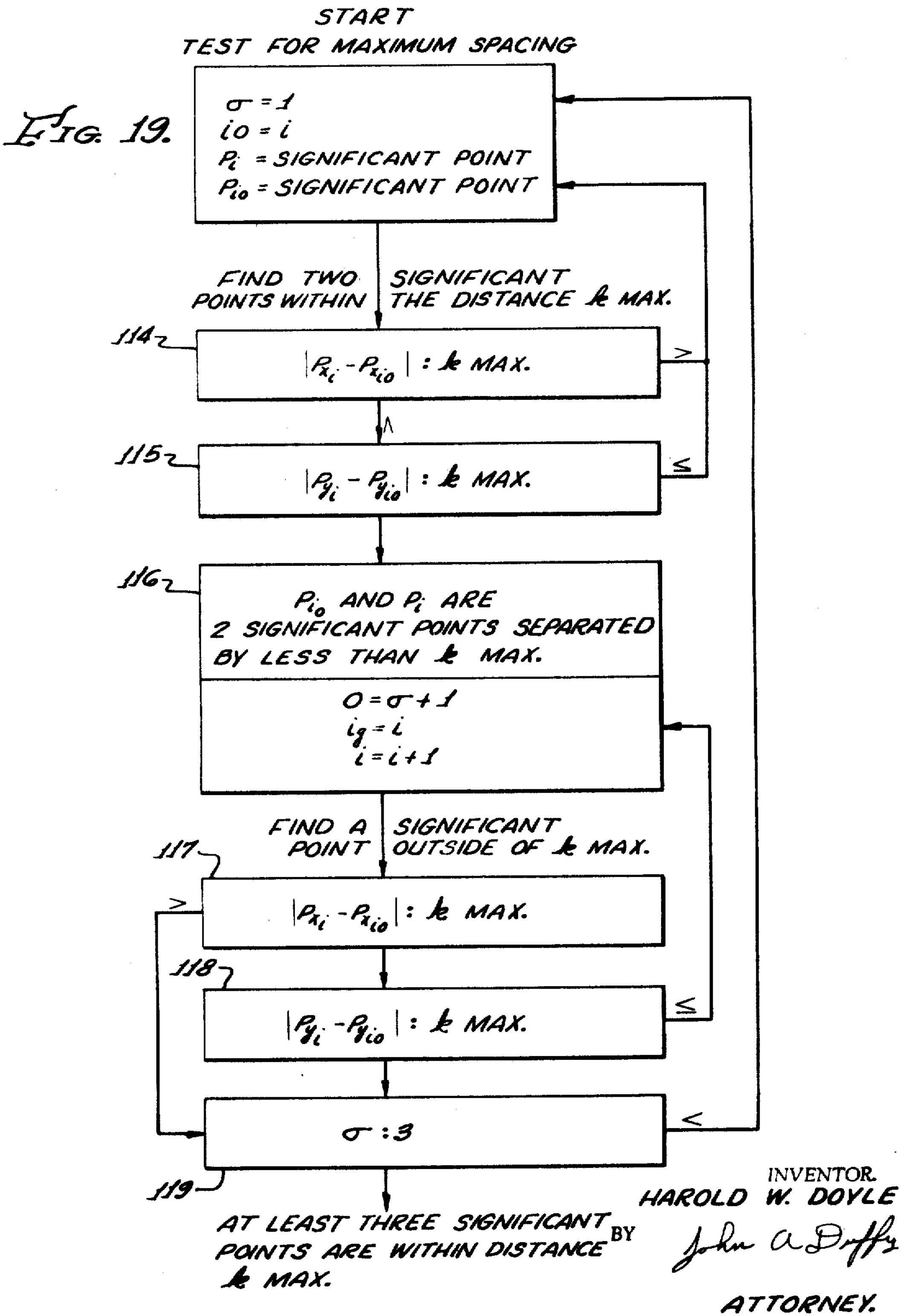
FIGURE 19 is a flow chart illustrating the test for a cluster of points by the control point computer.
Figure 20:
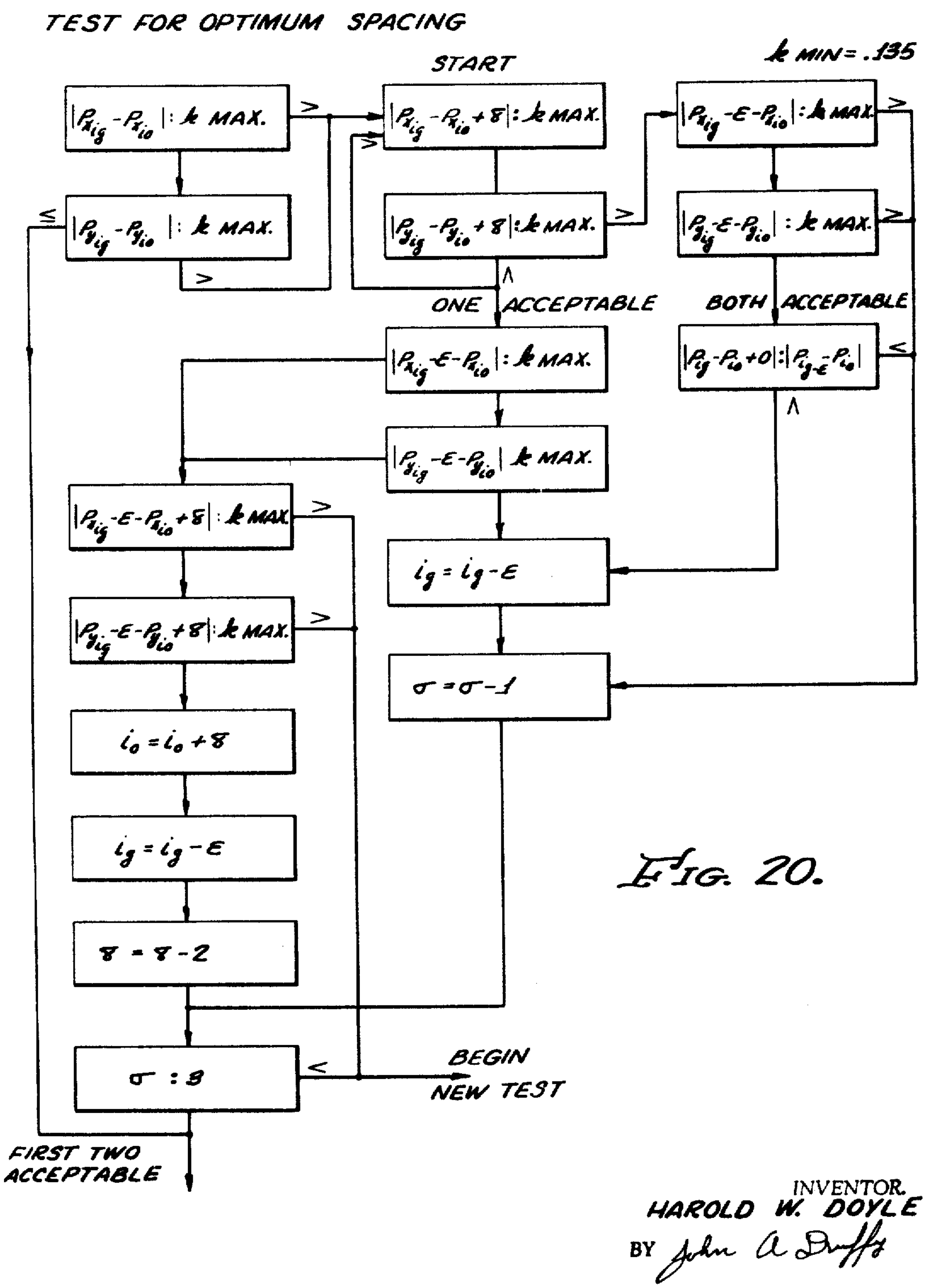
FIGURE 20 is a flow chart illustrating the test for adjusting the set of points in the cluster by the control point computer.

Turning now to the flow chart of FIG. 19 the test for maximum spacing is illustrated. Initially, the purpose of the maximum spacing test is to find two significant points within the distance $k_{max}$. Initially, as illustrated in the blocks 114 and 115, the distance between two significant points $P_{xi}-P_{xio}$ is compared to $k_{max}$. If $P_{xi}-P_{xio}$ is equal to or less than $k_{max}$ the $P_{yi}-P_{yio}$ is compared to $k_{max}$ in block 115 until two significant points are found which are less than the distance $k_{max}$ as shown in the block 116. This process is continued until a significant point is found outside of $k_{max}$ in block 117 wherein $P_{xi}-P_{xio}$ is compared to $k_{max}$ and $P_{yi}-P_{yio}$ is compared to $k_{max}$ (block 118). For a typical notch at least three significant points are found within the distance $k_{max}$ as illustrated in the block 119. When at least three significant points are found within the distance $k_{max}$ then the test as shown in FIG. 20 is conducted for optimum spacing of the end points of the notch. $K_{max}$ may be established, for example, at .135 inch. Then, according to the flow chart in FIG. 20 each of the distances illustrated between four significant end points are compared with $k_{max}$ until the best set of end points are found which are within the $k_{max}$ range. If three or more significant points remain within $k_{max}$ a notch is more firmly established.

Figure 21:
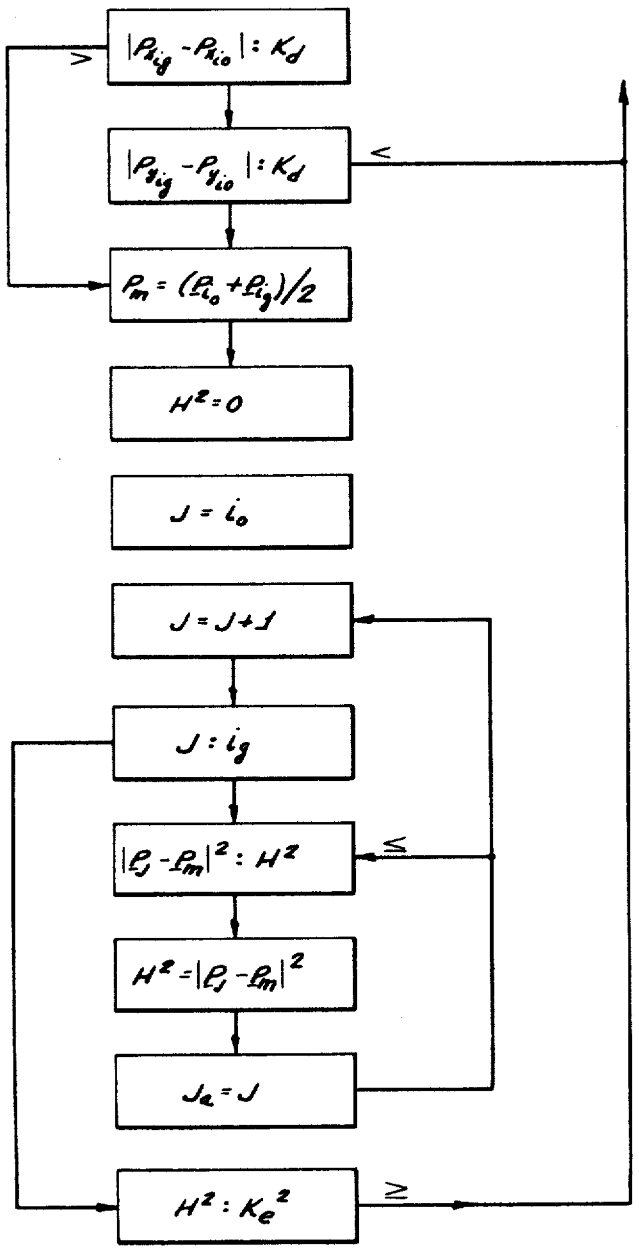
FIGURE 21 is a flow diagram illustrating the notch base line test by the control point computer of FIG. 2.
Figure 22:
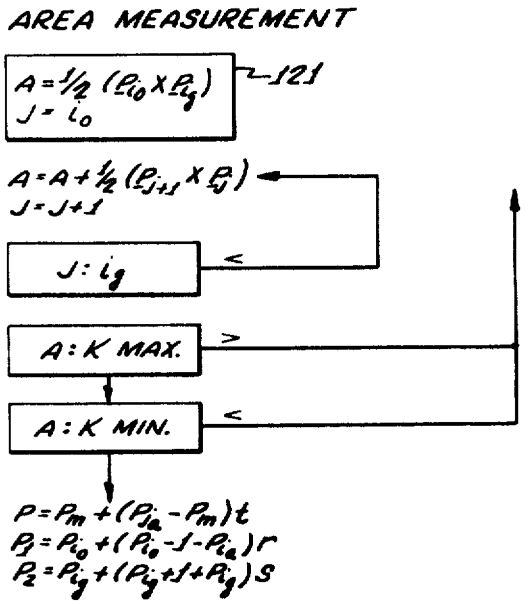
FIGURE 22 is a flow chart illustrating the notch area test by the control point computer of FIG. 2.

After the tests for maximum spacing and optimum spacing are conducted, the base line test of FIG. 21 is conducted. Basically, in the base line test two end points are found which represent the base line of the notch. For example, as illustrated in FIG. 18 the end points 112 and 113 are desired to be found. As illustrated in FIG. 21 the base line test basically comprises the comparison of $P_{xi9}-P_{xio}$ with $k_d$, wherein $k_d$ is equal to a predetermined distance such as .05 inch. The base line test is followed by a notch axis test, as illustrated in the flow chart of FIG. 21, which proceeds until $H^2=K^2$, wherein H is equal to the length of the notch axis and K is equal to a predetermined distance such as .2. When this is found then the two end points representing the end points of the base line of the notch have been determined, and the axis of the notch has been determined. Thus, as illustrated in FIG. 18, the points 112 and 113 are two end points representing the base line of the notch and the line passing through the points M and A is the axis of the notch. At the conclusion of the base line test the area measurement test is conducted as illustrated in the flow chart of FIG. 22. As seen in the diagram of FIG. 22 in the block 121

$$A=\tfrac{1}{2}(\underline{P}_{1o}\times\underline{P}_{1g})$$

initially wherein $P_{1o}$ and $P_{1g}$ are as shown in FIG. 18. The total area of the notch is computed according to the flow chart of FIG. 21.

Figure 23:
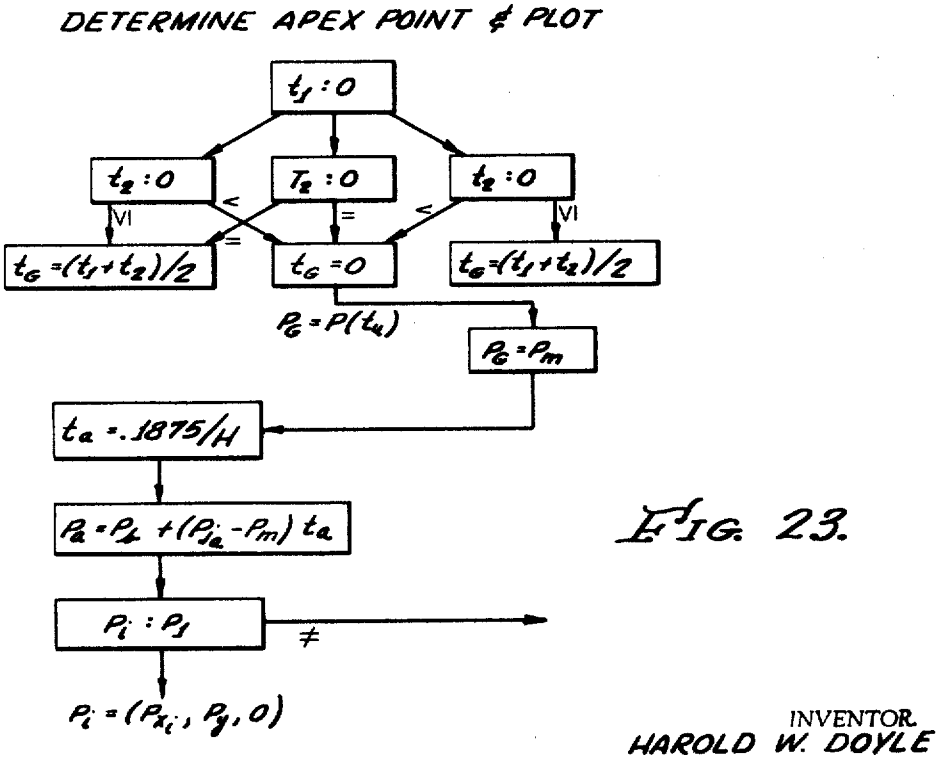
FIGURE 23 is a flow chart illustrating the test for determining the notch apex point by the control point computer of FIG. 2.

After the midpoint M has been determined and the notch axis, the apex point A in FIG. 13 is determined as illustrated in the flow diagram of FIG. 23. The output of the control point computer of FIG. 2, which is a point designating the notches, and the output of the grade computer 25 are then led to drive control 26 which provides the control signals to plot the graded patterns 28. The drive control 26 and the plotter 27 may be a typical digital incremental plotter and control logic as shown, for example in Patent No. 3,199,111 entitled "Graphical Data Recorder System."

Although the preferred embodiment of the present invention has been shown and described herein, it is to be understood that the invention is not to be limited thereto, for it is susceptible to changes in form and detail within the scope of the appended claims. For example, while the described embodiment makes use of Cartesian coordinate positional data, it is to be realized that a polar coordinate or an oblique coordinate system could be utilized as well. Again, although the use of an incremental plotter with an incremental pattern tracer particularly enhances the operation of the system, it would be well within the knowledge of those skilled in the art to utilize other forms of plotters and curve followers, including manual curve followers and various digital plotters as well as analog plotters. The drive control 29 of FIG. 2 could be modified to provide control to an analog plotter as well as any type of digital plotter.

I claim:

1. A system for selectively changing the boundary of a reference pattern to produce additional size patterns according to size data determining the adjustment factor of boundary edges, not all of the edges being adjusted by the same factor, said system comprising: means for converting the reference pattern boundary into positional data; means responsive to said positional data and to said size data for computing positional data for the boundaries of said additional size patterns; and means responsive to said additional positional data for reproducing the boundaries of said additional size patterns.

2. The system recited in claim 1 wherein said means for converting the reference pattern boundary into positional data comprises: means for tracing said boundary to provide a positional data based on X and Y coordinate axes; and means responsive to said positional data for providing significant point data according to maximum and minimum deviation criteria for said X and Y coordnate axes.

3. The system recited in claim 1 wherein is included means responsive to said positional data from said additional size patterns for displaying said positional data in pattern form.

4. A system for selectively changing the boundary of a reference pattern proportionately to produce additional size patterns according to predetermined size data comprising: means for converting the reference pattern boundary into positional data based on X and Y coordinate axes; means for converting said positional data into Cartesian point data; means for interpreting said Cartesian point data according to maximum and minimum deviation criteria for the X and Y coordinate axes to produce significant point positional data; means responsive to said significant point positional data for computing control points; means responsive to said computed control points and predetermined additional size pattern control data for computing offset control points for said additional size patterns; and means responsive to said intermediate points and said additional size pattern control data for computing offset intermediate points for said additional size patterns.

5. The system recited in claim 4 wherein is included plotter means for graphically displaying said control points, said computed offset control points, said offset intermediate points for the additional sizes, and said intermediate points for said reference pattern.

6. The system recited in claim 4 wherein said first mentioned means converts the reference pattern boundary into incremental positional data.

7. A system for grading a reference pattern to produce additional size patterns comprising: a pattern tracer for converting the reference pattern boundary into incremental positional data based on X and Y coordinate axes; a position data converter responsive to said tracer for converting said positional data into Cartesian point data; a significant point computer responsive to said Cartesian point data and maximum and minimum deviation criteria relative to said X and Y coordinate axes to produce significant point data; a control point computer responsive to said significant point data for computing control points; and a grade computer responsive to said control points, predetermined pattern control data corresponding to said additional size patterns, and said intermediate point data for computing offset control points and offset intermediate points for said additional size patterns.

8. The system recited in claim 7 wherein is included a plotter, and drive control means responsive to said grade computer and said control point computer for causing said plotter to graphically display said reference and additional size patterns.

9. The system recited in claim 7 wherein said position data converter comprises means for accumulating said incremental data, means for comparing actual binary sequences representative of said incremental data with predetermined binary sequences, and means responsive to said accumulating means and said comparing means for determining the representative position of said positional data when said actual binary sequences coincide with said predetermined binary sequences.

10. The system recited in claim 7 wherein said position data converter comprises: a step position register responsive to the incremental positional data from said pattern tracer for accumulating said increment; a binary pattern storage register responsive to said pattern tracer for storing actual binary sequences from incremental positional data; a reference pattern storage for storing predetermined binary sequences representative of positional data; a comparator for comparing said actual binary sequences with said predetermined binary sequences to detect coincidence; and a position computer responsive to said step position register and said comparator for computing the representative position of the accumulated positional data where coincidence is detected by said comparator; whereby the representative position of positional data in said actual binary sequences is determined when said comparator detects coincidence.

11. The system recited in claim 7 wherein said significant point computer comprises: means responsive to the Cartesian point data from said position data computer for computing primary significant points; said primary significant point computing means including means for comparing the slope of line segments between Cartesian position points selected in sequence with the X and Y axes; a primary significant point being established when the slope of a selected line segment changes quadrants; and means responsive to said primary significant points and intermediate Cartesian position points for computing secondary significant points; said secondary significant point computing means including means for comparing the slope of line segments between intermediate Cartesian position points selected in sequence, with a line segment between two primary significant points; a secondary significant point being established when the slope of a selected line segment passes from less than to greater than the slope of said line segment between two primary significant points.

12. The grading system recited in claim 7 wherein said control point computer comprises: means responsive to the significant point data from said significant point computer for determining the significant points which meet predetermined criteria established for identifying prescribed portions of said reference pattern, said predetermined criteria established according to the known dimensions of said prescribed portions.

13. The grading system recited in claim 7 wherein said grade computer comprises: computer means responsive to said control points, said intermediate points, said pattern control data, for computing offset control points according to said control points and said pattern control data and for computing offset intermediate points according to said intermediate points and said offset control points; said computer means including means responsive to two selected control points and one selected intermediate point, said two selected control points and one selected intermediate point comprising the vertices of a first triangle, and responsive to two offset control points computed from said selected control points for computing an offset intermediate point, said two offset control points and said computed offset intermediate point comprising the vertices for a second triangle; whereby said first and second triangles have equal angles.

14. A system for selectively changing the boundary of a reference pattern having a plurality of control points thereon to produce patterns of other sizes according to size data determining the adjustment factor of individual ones of the control points, not all of the control points being adjusted by the same factor, said system comprising: means for converting the reference pattern boundary and control points into positional data; means responsive to said positional data and to said size data for computing additional positional data for the adjusted control points and for the boundary of an additional size pattern graded between the adjusted control points; and means responsive to said additional positional data for displaying the boundary of said additional size pattern.

References Cited

UNITED STATES PATENTS

| | | | |
|---|---|---|---|
| 3,328,801 | 6/1967 | Boyle et al. | 346—31 |
| 3,320,409 | 5/1967 | Larrowe | 235—151 |
| 3,292,495 | 12/1966 | Hill et al. | 90—13.5 |
| 3,267,575 | 8/1966 | Beard | 33—23 |
| 2,992,375 | 7/1961 | Mustonen et al. | 318—21 |
| 2,868,993 | 1/1959 | Henry | 250—202 |
| 2,851,643 | 9/1958 | Limberger | 318—19 |
| 2,261,644 | 11/1941 | Cockrell | 250—41.5 |

PAUL J. HENON, *Primary Examiner.*

GARETH D. SHAW, *Examiner.*